United States Patent Office 2,860,066
Patented Nov. 11, 1958

2,860,066

STABILIZED PARAFFIN WAX RESISTANT TO DISCOLORATION BY LIGHT

Robert W. Provine, Lawrence T. Mehlhorn, Warren L. Thompson, and John Vernon Lawson, Tulsa, Okla., assignors to D-X Sunray Oil Company, Tulsa, Okla., a corporation of Delaware No Drawing. Application June 6, 1955
Serial No. 513,611

10 Claims. (Cl. 106—270)

The present invention relates to waxes and waxy compositions the color of which is stabilized against the influence of light so that the material, when it once has been bleached to the desired color, will not substantially darken in color even under comparatively long continued influence of incident light rays.

The subject invention is a continuation-in-part of copending application Serial No. 448,782, filed August 9, 1954, Patent No. 2,821,485.

The invention is primarily directed to the treatment of paraffin wax, and it is to be understood that it is also applicable to the treatment of paraffin wax in combination with microcrystalline wax, and to paraffin waxes blended with other substances, such as stearic acid or high molecular weight polymers such as polyethylene.

It is well known fact that paraffin waxes, even when highly refined, often become colored under the influence of light which is particularly disadvantageous when the waxes are used, for example, for the sealing of food packages and the like where any discoloration will often be looked upon as possibly being indicative of the deterioration of the contents of the container sealed by means of the wax. The provided stabilizers hereinafter to be disclosed find ready commercial application in the stabilization of the color in wax candles, and, in general, all wax novelties which greatly rely for their sales appeal on their brilliant hues.

An object of this invention is to produce a mixture of wax with certain phosphoric acid esters which have been found to effect stabilization against darkening under the influence of light even when used in minute quantities.

It is a further object of the invention to produce a mixture of wax which contains N-substituted aminobenzoic acid compounds or the esters thereof and certain esters of phosphoric acid, which compounds, when used conjointly and even in relatively small amounts, stabilize the material against darkening under the influence of light.

The phosphoric acid esters are preferably employed in the wax as color stabilizers in amounts ranging from 0.01% to 1.0% by weight.

Broadly, the organic phosphates employed for the practice of the present invention may have the structural formula

in which R, R' or R'' may be alkyl, aryl, alkaryl, or dialkaryl.

The phosphoric acid esters will function when used alone but are particularly effective when utilized with an N-substituted aminobenzoic acid compound which may be added to the waxy material in the amount of from 0.0001% up to about 1.0% by weight, the preferable range of the latter being between 0.01% and 0.1% by weight. The aminobenzoic acid type compound further enhances the color stabilization of waxes by the phosphoric acid esters as will hereinafter become more apparent.

The N-substituted aminobenzoic acid compounds have the carboxyl or acyl group in the number one position on an aromatic nucleus, while a substituted amino group is located upon one of the other positions of the aromatic nucleus, and particularly either in the ortho or para position, although the meta position is not to be excluded. These latter compounds have the structural formula:

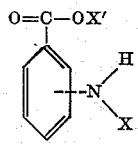

in which X and X' may represent hydrogen, acyl, aryl, alkyl, alkenyl, alkaryl, and aralkyl groups, and in which the

group may be in the ortho, meta, or para positions relative to the O=C—OX' group.

The following description is illustrative of the method of carrying out the present invention, and of the effectiveness of a number of materials used.

The wax used was a paraffin having an ASTM melting point of 132° F. and color, as measured in a 6 inch Lovibond cell (500 amber series), of 0.4, while the oil content as determined by ASTM methods was 0.7%.

Samples of this wax were tested in two different ways. The first series of test samples of the wax were put into tall 4-ounce bottles and hung in direct sunlight for a total period of eight hours (two days from 10:00 A. M. to 2:00 P. M. each day) whereafter the exposed samples were carefully melted and their colors determined.

In another series of tests the wax was poured into an aluminum pan to a depth of from about ¼ to ½ inch in thickness and allowed to solidify. The slab thus prepared was then placed in direct sunlight for a period of eight hours (two days from 10:00 A. M. to 2:00 P. M. each day) whereafter the exposed samples were carefully melted and their color determined. In the subjoined Table I the results are tabulated:

*Table I*

| Sample | Color 6" Lovibond cell (500 amber series) | |
|---|---|---|
| | Exposed in 4-oz. bottles | Exposed in slabs |
| A. Paraffin Wax—no inhibitor | 31 | 33 |
| +{0.01% N-phenyl anthranilic acid / 0.5% tri (2-ethylhexyl) phosphate} | 2 | 4½ |
| +{0.01% N-phenyl anthranilic acid / 0.1% tri (2-ethylhexyl) phosphate} | 5 | 8 |
| +0.5% tri (2-ethylhexyl) phosphate | 6½ | 9 |
| +0.1% tri (2-ethylhexyl) phosphate | 20 | |
| +0.01% tri (2-ethylhexyl) phosphate | 24 | |
| +0.01% p-benzoylamido benzoic acid | 20 | 23 |
| +{0.01% p-benzoylamido benzoic acid / 0.5% tri (2-ethylhexyl) phosphate} | 6 | 8 |
| B. Paraffin Wax—no inhibitor | 40 | 55 |
| +0.5% tripropyl phosphate | 7 | 14 |
| +{0.01% N-phenyl anthranilic acid / 0.5% tripropyl phosphate} | 6 | 7 |
| +0.5% 2-biphenylyl diphenyl phosphate | 25 | 30 |
| +{0.01% N-phenyl anthranilic acid / 0.5% 2-biphenylyl diphenyl phosphate} | 13 | 14 |
| +0.5% tri (tertiary-amylphenyl) phosphate | 25 | 37 |
| +{0.01% N-phenyl anthranilic acid / 0.5% tri (tertiary-amylphenyl) phosphate} | 15 | 15 |
| +0.5% tris (di-tertiary-amylphenyl) phosphate | 20 | 32 |
| +{0.01% N-phenyl anthranilic acid / 0.5% tris (di-tertiary-amylphenyl) phosphate} | 8 | 13 |

Table I.—Continued

| Sample | Color 6″ Lovibond cell (500 amber series) | |
|---|---|---|
| | Exposed in 4-oz. bottles | Exposed in slabs |
| C. {80% Paraffin Wax / 20% Triple pressed stearic acid—no inhibitor | 11 | 22 |
| + {0.01% N-phenyl anthranilic acid / 0.5% tri (2-ethylhexyl) phosphate | 3 | 6½ |
| +0.5% tri (2-ethylhexyl) phosphate | 4½ | 10 |
| + {0.01% p-benzoylamido benzoic acid / 0.5% tri (2-ethylhexyl) phosphate | 4 | 8 |
| D. {90% Paraffin Wax / 10% 190 White microcrystalline wax—no inhibitor | 31 | 33 |
| + {0.01% N-phenyl anthranilic acid / 0.5% tri (2-ethylhexyl) phosphate | 4½ | 7 |
| + {0.01% N-phenyl anthranilic acid / 0.1% tri (2-ethylhexyl) phosphate | 5 | 10 |
| +0.5% tri (2-ethylhexyl) phosphate | 7 | 20 |
| + {0.01% p-benzoylamido benzoic acid / 0.5% tri (2-ethylhexyl) phosphate | 6 | 15 |
| E. {95% Paraffin Wax / 5% Polyethylene (12,000 M. W.)—no inhibitor | 30 | 32 |
| + {0.01% N-phenyl anthranilic acid / 0.5% tri 2-ethylhexyl) phosphate | 4 | 6 |
| +0.5% tri (2-ethylhexyl) phosphate | 5 | 8 |

It will be seen from the preceding table that for the paraffin wax, in part A, exposure of direct sunlight increased the color from 0.4 up to 31 in the 4-ounce bottle and up to 33 in the exposed slabs. However, when 0.01% of N-phenyl anthranilic acid and 0.5% of tri(2-ethylhexyl) phosphate were added, the color rose only to 2 in the 4-ounce bottles and to 4.5 in the exposed slabs. A 0.1% concentration of tri(2-ethylhexyl) phosphate in the wax plus 0.01% of N-phenyl anthranilic acid gave the favorable color readings of 5 in the 4-ounce bottles and 8 in the exposed slabs. A 0.01% concentration of tri(2-ethylhexyl) phosphate alone resulted in the reduced color of 24 in the 4-ounce bottles. A 0.5% concentration of tri(2-ethylhexyl) phosphate alone resulted in the impressive reduced color of 6.5 in the bottles and of 9 in the exposed slabs. When 0.01% of p-benzoylamido benzoic acid and 0.5% of tri(2-ethylhexyl) phosphate were added, the color was reduced still further to 6 in the 4-ounce bottles and to 8 in the exposed slabs.

The paraffin wax found in section B of the above table had a color of 40 in the 4-ounce bottles and a color of 55 in the exposed slabs after 8 hours of exposure to direct sunlight. However, when 0.5% of tripropyl phosphate was added to this paraffin wax, the color was only 7 in the 4-ounce bottles and 14 in the exposed slabs after 8 hours exposure to sunlight. When 0.01% of N-phenyl anthranilic acid and 0.5% of tripropyl phosphate were added, the more favorable color of 6 was obtained in the bottles and a color of 7 was obtained in the exposed slabs. It will also be noted that 0.5% concentrations of 2-biphenylyl diphenyl phosphate and of tri(tertiary amylphenyl) phosphate when used singly gave favorable color reductions to the wax in both the bottles and the exposed slabs. When 0.01% of N-phenyl anthranilic acid was added to each of the above phosphates, the color readings were more favorable. It will also be seen in section B of the table that tris(di-tertiary-amylphenyl) phosphate when used in 0.5% concentrations either alone or with 0.01% N-phenyl anthranilic acid also gave impressive color readings for the wax in both the bottles and the exposed slabs.

It will be seen from section C of the table that when 0.5% of tri(2-ethylhexyl) phosphate was added to a wax composition comprising 80% paraffin wax and 20% triple pressed stearic acid, an exceedingly good color resulted in the wax contained in both the bottles and pans after 8 hours exposure to direct sunlight. The color of this wax composition was even more favorable after exposure when 0.01% of either N-phenyl anthranilic acid or of p-benzoylamido benzoic acid was added to the mixture containing a 0.5% concentration of the tri(2-ethylhexyl) phosphate.

In section D of the table, the very impressive color readings of exposed wax mixtures comprising 90% paraffin wax and 10% 190 white microcrystalline wax will be noted. The color-inhibiting additives utilized with this wax mixture were tri(2-ethylhexyl) phosphate alone, or in varying percentages in combination with 0.01% of N-phenyl anthranilic acid or p-benzoylamido benzoic acid. When 0.01% of p-benzoylamido benzoic acid and 0.5% of tri(2-ethylhexyl) phosphate were added to the paraffin-white microcrystalline wax mixture, the color was reduced from 31 to 4 in the 4-ounce bottle and from 33 to 8 in the exposed slabs after 8 hours of direct sunlight.

Referring now to section E of the table, it will be noted that a mixture comprising 95% paraffin wax and 5% polyethylene is stabilized against the influence of light by a 0.5% addition of tri(2-ethylhexyl) phosphate when used alone and when used conjointly with 0.01% of N-phenyl anthranilic acid. The color reading of the polyethylene and wax mixture is reduced from 30 to 5 in the 4-ounce bottles and from 32 to 8 in the exposed slabs when 0.5% of tri(2-ethylhexyl) phosphate is added. A 0.01% concentration of N-phenyl anthranilic acid in combination with the 0.5% concentration of tri(2-ethylhexyl) phosphate reduces the color reading of the wax-polyethylene mixture still further to 4 in the 4-ounce bottles and to 6 in the exposed slabs.

It is thus seen that the organic esters of phosphoric acid efficiently perform as wax stabilizers, inhibiting the influence of light. The esters perform still more efficiently when used conjointly with an N-substituted aminobenzoic acid compound.

The method of introducing the color-stabilizing material is extremely simple, the material merely being thoroughly stirred into the molten wax before the same is cast into slabs or other forms for commercial distribution. In the slight amounts used the inhibitors are all completely miscible with the molten wax.

The phosphoric acid esters, in addition to being used with the N-substituted aminobenzoic acids, may also be used with the esters of these acids.

It is not intended to limit the present invention to the particular method of incorporation of these ingredients, provided only that the desired products are obtained, the color change of which is inhibited by the presence of the materials mentioned in the claims.

We claim:

1. A paraffin wax composition stabilized against color change incident to exposure to light having added thereto from about 0.01 percent to 1.0 percent of an ester of phosphoric acid having the general structural formula

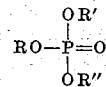

wherein R, R′ and R″ are each radicals selected from the group consisting of alkyl, phenyl, biphenyl and alkyl-substituted phenyl.

2. A composition as claimed in claim 1 in which R, R′ and R″ are all 2-ethylhexyl.

3. A composition as claimed in claim 1 in which R is xenyl and R′ and R″ are both phenyl.

4. A composition as claimed in claim 1 in which R, R′ and R″ are all propyl.

5. A composition as claimed in claim 1 in which R, R′ and R″ are all tertiary-amylphenyl.

6. A composition as claimed in claim 1 in which R, R′ and R″ are all di-tertiary-amylphenyl.

7. A paraffin wax composition the color of which is stabilized against substantial changes caused by light having added thereto from about 0.01 percent to 1.0 percent of an ester of phosphoric acid having the general structural formula

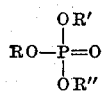

wherein R, R' and R" are each radicals selected from the group consisting of alkyl, phenyl, biphenyl and alkyl-substituted phenyl, and from about 0.0001 percent to 1.0 percent of a compound selected from the group consisting of N-phenyl anthranilic acid and p-benzoyl amidobenzoic acid.

8. A composition as claimed in claim 7 in which said compound is N-phenyl anthranilic acid.

9. A composition as claimed in claim 7 in which said compound is p-benzoyl amidobenzoic acid.

10. A composition as claimed in claim 7 in which said compound is N-phenyl anthranilic acid, and R, R' and R" are each 2-ethylhexyl.

References Cited in the file of this patent

UNITED STATES PATENTS

| | | |
|---|---|---|
| 2,300,611 | Christmann et al. | Nov. 3, 1942 |
| 2,300,612 | Christmann et al. | Nov. 3, 1942 |
| 2,369,090 | Trautman | Feb. 6, 1943 |
| 2,569,122 | Adelson | Sept. 25, 1951 |
| 2,739,122 | Kennerly et al. | Mar. 20, 1956 |
| 2,771,367 | Thompson et al. | Nov. 20, 1956 |